(12) United States Patent
Pyun et al.

(10) Patent No.: US 9,858,465 B2
(45) Date of Patent: Jan. 2, 2018

(54) ELECTRONIC DEVICE COMPRISING MINIMUM SENSING AREA AND FINGERPRINT INFORMATION PROCESSING METHOD THEREOF

(71) Applicants: CRUCIALTEC CO., LTD., Asan-si (KR); CANVASBIO CO., LTD., Seongnam-si (KR)

(72) Inventors: Baek Bum Pyun, Seoul (KR); Woo Taek Lim, Seoul (KR); Sung Chan Park, Seoul (KR); Jae Han Kim, Seongnam-si (KR)

(73) Assignees: CRUCIALTEC CO., LTD., Asan-si; CANVASBIO CO., LTD., Seongnam-si ( * ) Notice: Subject to any disclaimer, the term of this patent is extended or adjusted under 35 U.S.C. 154(b) by 0 days.

(21) Appl. No.: 15/117,934

(22) PCT Filed: Jun. 11, 2014

(86) PCT No.: PCT/KR2014/005102
§ 371 (c)(1),
(2) Date: Aug. 10, 2016

(87) PCT Pub. No.: WO2015/122577
PCT Pub. Date: Aug. 20, 2015

(65) Prior Publication Data
US 2016/0350580 A1 Dec. 1, 2016

(30) Foreign Application Priority Data

Feb. 14, 2014 (KR) .................. 10-2014-0017512
May 29, 2014 (KR) .................. 10-2014-0065418

(51) Int. Cl.
*G06K 9/00* (2006.01)
*G06T 5/00* (2006.01)
(Continued)

(52) U.S. Cl.
CPC ..... *G06K 9/00067* (2013.01); *G06K 9/00013* (2013.01); *G06K 9/00073* (2013.01);
(Continued)

(58) Field of Classification Search
CPC .......... G06K 9/00067; G06K 9/00013; G06K 9/00073; G06K 9/40; G06T 5/002; G06T 5/20
See application file for complete search history.

(56) References Cited

U.S. PATENT DOCUMENTS 5,659,626 A * 8/1997 Ort ..................... G06K 9/00067
382/125
6,289,112 B1 * 9/2001 Jain .................... G06K 9/00067
382/116
(Continued)

FOREIGN PATENT DOCUMENTS

JP 2002-259982 9/2002
JP 2003-044856 2/2003
(Continued)

OTHER PUBLICATIONS

International Search Report for International Application No. PCT/KR2014/005102.

*Primary Examiner* — David F Dunphy
(74) *Attorney, Agent, or Firm* — H.C. Park & Associates, PLC

(57) ABSTRACT

According to one embodiment, provided is a method by which an electronic device comprising a minimum fingerprint sensing area processes fingerprint information, comprising the steps of: acquiring a fingerprint image from the fingerprint sensing area; calculating a shade change value, defined by a shade difference value from a neighboring pixel, for each pixel of the fingerprint image; selecting points, as feature point candidates, of which the shade change value is a threshold value or more; applying artificial
(Continued)

distortion for noise filtering to an area including the feature point candidates and neighboring pixels thereof; and selecting, as final feature points, candidates of which the shade change value after the artificial distortion is within a threshold range from among the feature point candidates.

10 Claims, 6 Drawing Sheets

(51) Int. Cl.
    *G06T 5/20*     (2006.01)
    *G06K 9/40*     (2006.01)

(52) U.S. Cl.
    CPC ................ *G06K 9/40* (2013.01); *G06T 5/002* (2013.01); *G06T 5/20* (2013.01)

(56) References Cited

U.S. PATENT DOCUMENTS

| | | | | |
|---|---|---|---|---|
| 2002/0146178 | A1* | 10/2002 | Bolle | G06K 9/00067 382/254 |
| 2008/0101663 | A1* | 5/2008 | Lo | G06K 9/0008 382/124 |
| 2009/0226052 | A1* | 9/2009 | Fedele | G06K 9/00046 382/125 |
| 2009/0257672 | A1* | 10/2009 | Sullender | H04N 5/217 382/260 |

FOREIGN PATENT DOCUMENTS

| | | |
|---|---|---|
| KR | 2000-0034228 | 6/2000 |
| KR | 10-2007-0023217 | 2/2007 |

\* cited by examiner

ELECTRONIC DEVICE COMPRISING MINIMUM SENSING AREA AND FINGERPRINT INFORMATION PROCESSING METHOD THEREOF

CROSS-REFERENCE TO RELATED APPLICATIONS

This application is the National Stage Entry of International Patent Application No. PCT/KR2014/005102, filed on Jun. 11, 2014, and claims priority from and the benefit of Korean Patent Application No. 10-2014-0017512, filed on Feb. 14, 2014, and Korean Patent Application No. 10-2014-0065418, filed on May 29, 2014, each of which is hereby incorporated by reference for all purposes as if fully set forth herein.

BACKGROUND

Field

Exemplary embodiments of the present invention relate to an electronic device including a minimum fingerprint sensing area and a fingerprint information processing method thereof, and more particularly, to a device and method capable of accurately registering and identifying a fingerprint only with sensing a very small area of a fingerprint.

Discussion of the Background

As a fingerprint pattern is unique to each individual person, fingerprints are widely used in the field of personal identification. Particularly, fingerprints are widely used in methods for personal identification in various fields such as finance, criminal investigations, security, etc.

A fingerprint sensor has been developed for recognizing the above described fingerprints and identifying each individual person. The fingerprint sensor is a device that comes into contact with a human finger to recognize the fingerprint of the finger and is used as a method of determining whether the user is an authorized user.

As methods for implementing a fingerprint recognition sensor, various recognition methods including an optical method, a thermal sensing method, a capacitive method, etc. are known. Among these methods, the fingerprint recognition sensor by the capacitive method acquires a shape of a fingerprint (a fingerprint pattern) by detecting variations of capacitance according to shapes of ridges and valleys of a fingerprint when a surface of a human finger comes into contact with a conductive sensing pattern.

Recently, handheld devices provide not only telecommunication functions such as a phone call and a short message service but also various supplementary features for finance, security, etc. that utilize personal information, and thereby a need for a locking mechanism of the handheld devices is an issue of growing importance. To improve the locking mechanism of the handheld devices, terminal devices in which the locking mechanism is installed using the fingerprint recognition are being developed.

Recently, smartphones show trends of miniaturization, slimming, shortening, and lightening, and because it is preferable that the area of the display unit be maximized for user convenience, minimizing the non-display region in which the fingerprint sensors (12 and 22) are installed is eventually essential.

Therefore, a technology is necessary capable of enhancing user convenience in registering and identifying a fingerprint, reducing the non-display region in which a fingerprint detection unit is installed, and registering and identifying a fingerprint with high accuracy with a minimum sensing area at the expense of a reduction of the non-display region.

SUMMARY

Exemplary embodiments provide an acquiring feature information of a fingerprint and performing highly accurate fingerprint identification using the feature information of the fingerprint even when the fingerprint image acquired is from a minimum sensing area.

Additional aspects will be set forth in the detailed description which follows, and, in part, will be apparent from the disclosure, or may be learned by practice of the inventive concept.

One aspect of the present invention provides a fingerprint information processing method for an electronic device including a minimum fingerprint sensing area, in which the method includes acquiring a fingerprint image from the fingerprint sensing area, calculating an intensity variation value defined as an intensity difference value with respect to a neighboring pixel for each pixel of the fingerprint image, selecting points, each of which the intensity variation value is a threshold value or more, as feature point candidates, applying artificial distortion to a region including the feature point candidates and neighboring pixels thereof for noise filtering, and selecting candidates, each of which the intensity variation value after the artificial distortion is within a threshold range, among the feature point candidates as final feature points.

The fingerprint information processing method may further include performing fingerprint identification by comparing the final feature points with feature points of a preregistered fingerprint.

The performing of the fingerprint identification may include comparing an intensity variation vector having an intensity variation value and an intensity variation direction at each of the final feature points with an intensity variation vector at each of the feature points of the preregistered fingerprint.

The performing of the fingerprint identification may further include, before the comparing, selecting a target portion to be compared by comparing locations of the final feature points and the feature points of the preregistered fingerprint.

The fingerprint information processing method may further include casting each intensity variation value and mutual location information of the final feature points into a template format for storing.

The fingerprint information processing method may further include storing at least one of an intensity variation vector including an intensity variation value and an intensity variation direction and types of the feature points in the final feature points.

The applying of the artificial distortion may include applying a Gaussian filter to a region including the feature point candidates and the neighboring pixels thereof.

Another aspect of the present invention provides an electronic device including a fingerprint sensor which scans a fingerprint of a finger in contact with a minimum fingerprint sensing area to acquire a fingerprint image, and an information processing device which performs calculating an intensity variation value defined as an intensity difference value from a neighboring pixel for each pixel of the fingerprint image, selecting points, each of which the intensity variation value is equal to or more than a threshold value, as a feature point candidate, and selecting candidates, each of which the intensity variation value after the artificial distortion for noise filtering is within a threshold range, among the feature point candidates as a final feature point.

The information processing device may include a fingerprint identification unit which performs fingerprint identification by comparing an intensity variation vector including an intensity variation value and an intensity variation direction at each of the final feature points with an intensity variation vector at each of the feature points of a preregistered fingerprint.

The information processing device may include a fingerprint registration unit which casts each intensity variation value and mutual location information of the final feature points into a template format for storing.

According to the embodiment of the present invention, sufficient feature information of a fingerprint can be extracted from a fingerprint image extracted from a minimum fingerprint sensing area.

According to the embodiment of the present invention, accuracy of identification can be improved even with a fingerprint sensed by a touch method in a fingerprint detection unit with a small area.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
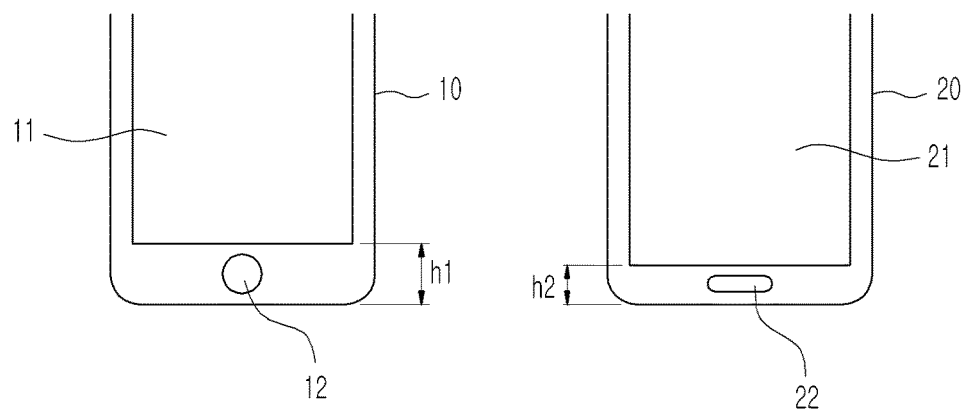
FIG. 1 is a view illustrating examples of handheld devices, for example, smartphones, in which a fingerprint sensor is installed.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Hereinafter, embodiments of the present invention will be described with reference to the accompanying drawings. The present invention may, however, be embodied in various different forms and is not to be construed as limited to the embodiments set forth herein. Further, in the drawings, for the sake of clarity of the present invention, an illustration may have omitted portions unrelated to the explanation, and like numbers refer to like elements throughout the specification.

In this specification, it should be understood that when an element is referred to as being "connected" or "coupled" to another element, it may be directly connected or coupled to the other element or intervening elements may be present. Where the terms "comprise," "comprises," "comprising," "include," "includes," "included" or "including" are used, they should be interpreted as that one or more other elements may further be added and should not be interpreted as excluding other elements unless specifically otherwise described.

Hereinafter, embodiments of the present invention will be described in detail with reference to the accompanying drawings.

FIG. 1 illustrates an example of a handheld device, for example, a smartphone, in which a fingerprint sensor is installed.

First, referring to FIG. 1, a smartphone 10 has a display unit 11 which also performs a function of an input portion by a touch screen method, and a fingerprint sensor 12 is installed at a lower portion thereunder. The fingerprint sensor 12 is formed at a lower end of the main body of the smartphone 10 and is implemented along with a home key that moves a screen of the display unit 11 to home.

Next, also in a smartphone 20 illustrated in FIG. 1, a fingerprint sensor 22 is installed at a lower portion below a display unit 21 along with a home key.

According to the installation of the fingerprint sensors 12 and 22, it becomes inevitable that a region besides the display units 11 and 21, that is, a non-display region is needed on the smartphones 10 and 20. The fingerprint sensors 12 and 22 are installed at such non-display regions, where the height h1 of the non-display region of the smartphone 10 is relatively larger than the height h2 of the non-display region of the smartphone 20 because the area occupied by the fingerprint sensor 12 is larger than the area occupied by the fingerprint sensor 22.

A method of detecting a fingerprint is classified as a touch method (or, an area method) and a swipe method, and generally, the touch method is applied to the fingerprint sensor 12 and the swipe method is applied to the fingerprint sensor 22.

The touch method is a method in which, when a finger is placed on the fingerprint sensor 12 for a certain amount of time, a fingerprint image from a corresponding fingerprint sensing area is acquired. Meanwhile, the swipe method is a method in which the fingerprint sensor 22 senses a fingerprint of a moving finger when the finger slidingly moves on the fingerprint sensor 22, reads fragmented fingerprint images, matches the fragmented fingerprint images into one image, and thereby acquire an intact image of the fingerprint.

The swipe method has a constraint that the direction and speed of the finger being rubbed should be calculated and considered in detecting the fingerprint however has an advantage in that the area occupied by the fingerprint sensor 22 is small.

Meanwhile, the touch method needs to secure a certain amount or more of fingerprint sensing area as by sensor 12 because the touch method needs to sufficiently acquire a fingerprint image from the limited area. In addition, acquiring a fingerprint image requires at least ten times of touching because an image is not sufficiently acquired with touching only once.

Figure 2:
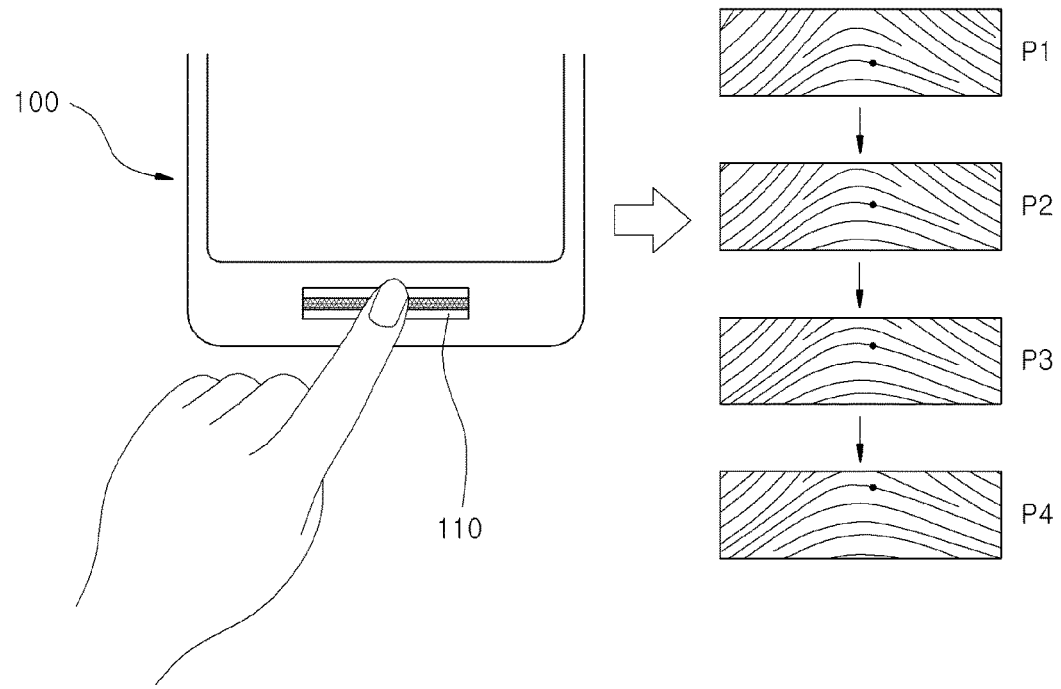
FIG. 2 is a view for describing a process of acquiring a fingerprint image according to one embodiment of the present invention.

FIG. 2 is a view for describing a general method of acquiring a fingerprint image.

As described above, a touch method of detecting a fingerprint acquires a fingerprint image of the corresponding region when a finger is placed on a fingerprint sensor.

Meanwhile, a swipe method acquires a fingerprint image by a principle as illustrated in FIG. 2.

Specifically, fragmented images P1 to P4 are sequentially acquired when a user places a finger on a fingerprint sensor 110 provided at a lower end region of an electronic device 100 as illustrated in FIG. 2 and slidingly moves the finger.

That is, fingerprint images of the user are sequentially acquired in a fragmented form consecutively. The fragmentary fingerprint images P1 to P4 read by the fingerprint sensor 110 are matched to one fingerprint image, and thereby an intact fingerprint image is acquired.

Figure 3:
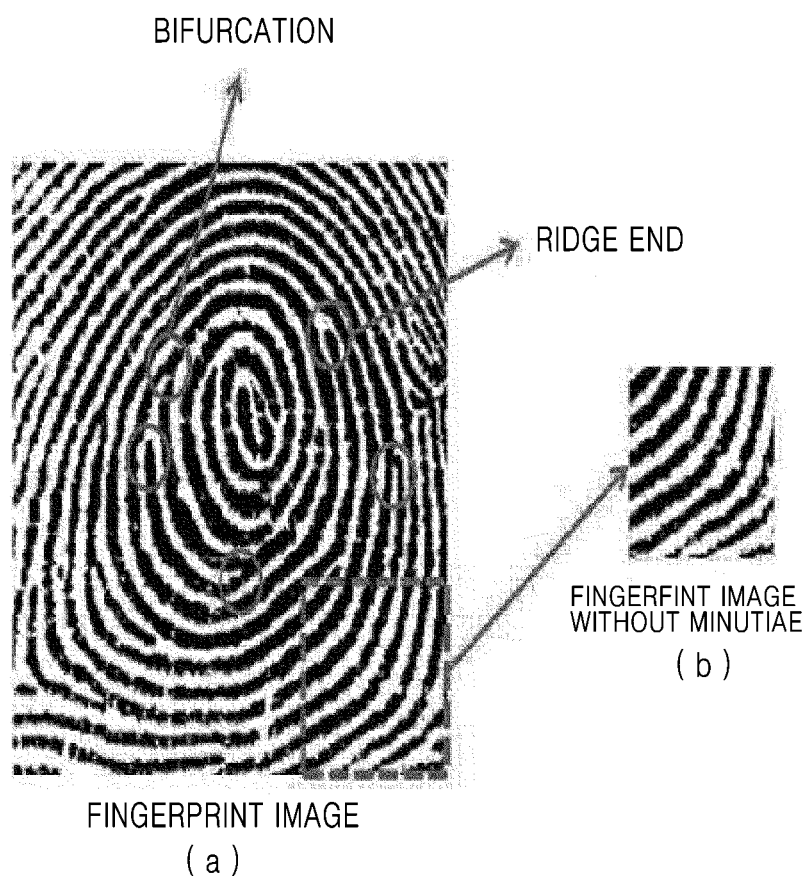
FIG. 3 is an example view illustrating minutiae which exist on a fingerprint image.

FIG. 3 is a view illustrating minutiae which exist on a typical fingerprint image.

A fingerprint image 310 acquired by the swipe method or the touch method described with reference to FIG. 2 may be the same as FIG. 3A.

When a fingerprint image for a wide area of finger is acquired, feature points of the fingerprint on the fingerprint image, that is, minutiae which are minute feature points including a ridge end, bifurcation, etc. found in the fingerprint image may exist. In this case, characteristic information of the fingerprint image may be acquired by detecting the minutiae.

However, when a fingerprint image is acquired only from a restricted small region of a finger, minutiae may not exist in the fingerprint image.

For example, a fingerprint image in which minutiae are not seen may be acquired when a fingerprint image in which a ridge of the fingerprint is simply arranged in a specific direction only is acquired as illustrated in FIG. 3B.

In the embodiment of the present invention, in such a fingerprint image in which minutiae do not exist, an intensity variation characteristic of a fingerprint image is employed to find a point having feature information (hereinafter, referred to as "feature point"). Specifically, the feature point of the fingerprint is selected by finding a pixel for which an intensity difference with respect to a neighboring pixel is equal to or more than a threshold value. In this specification, an intensity difference value between a particular pixel and a neighboring pixel is referred to as an "intensity variation value" of the pixel.

Figure 4:
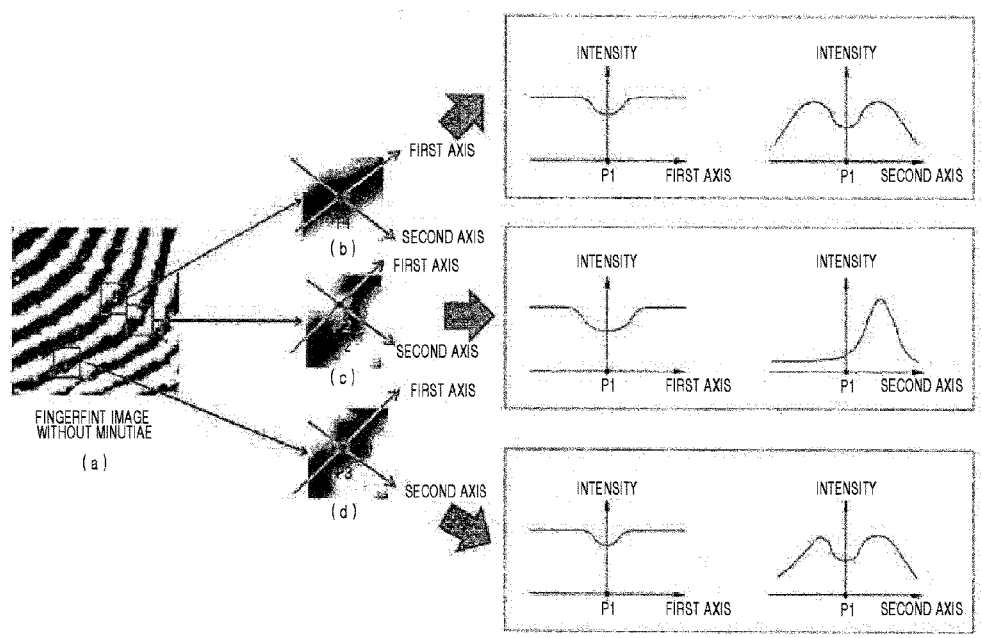
FIG. 4 is a view illustrating feature information of a fingerprint image according to one embodiment of the present invention.

FIG. 4 is a view for describing a method of finding feature points of a fingerprint image in which normal minutiae do not exist according to an embodiment of the present invention.

Specifically, referring to FIG. 4A, ridges are simply arranged in a particular direction in the fingerprint image.

However, when magnified, it may be seen that the ridges have a characteristic shape rather than a uniform thickness. For example, a specific point of the ridge may protrude toward the outside as shown in FIG. 4B, and a specific point of the ridge may be dented in toward the inside as shown in FIG. 4A. In addition, a hole may be formed due to a sweat pore in the middle of the ridges as shown in FIG. 4D.

The features shown in FIGS. 4B to 4D may be detected by determining the difference between the intensity variation value and average variation value of the fingerprint image. That is, the existence of the feature point may be confirmed on the basis of how much the intensity variation value at the ridge or the neighboring region thereof is sharply changed as compared with the average variation value in FIGS. 4B to 4D.

For example, the intensity variation value of the location becomes large when a protruding point or dented point exists or when a pore is formed at the ridge while the intensity variation value at the image of the ridge arranged in a uniform thickness does not deviate from a regular range on the basis of an average variation value.

When FIG. 4D is taken as an example, the intensity variation becomes sharp at the ridge near which a pore exists while only the average intensity variation value is shown throughout the whole fingerprint image when only the ridge of a uniform thickness exists, and thereby the feature points may be detected at the fingerprint image based on such features.

When described more specifically, the intensity variation value in a particular direction may be obtained at each pixel of a fingerprint image.

When looking into each of the graphs illustrated in FIG. 4, the intensity variation value in various directions may be obtained for a particular pixel P.

First, referring to the graph of FIG. 4B, it may be seen that the intensity variation value in a first axis direction for a first pixel P1 is the same as the intensity variation value in a second axis direction for the first pixel P1.

Next, referring to the graph of FIG. 4C, it may be seen that the intensity variation value in a first axis direction for a second pixel P2 is different from the intensity variation value in a second axis direction, and, also in the second axis direction, the intensity variation value in a positive direction (in a lower-right direction in the drawing) is different from the intensity variation value in a negative direction.

In addition, referring to the graph of FIG. 4D, it may be seen that the intensity variation value in a first axis direction for a third pixel P3 is different from the intensity variation value in a second axis direction.

That is, at each of the pixels P1 to P3, the intensity variation values in the first axis direction show similar patterns, but the intensity variation value of each in the second axis direction perpendicular to the first axis direction shows a different pattern.

A feature point of a fingerprint may be detected by the feature of the intensity variation value at each pixel because there are multiple directions passing through each of the pixels P1 to P3 and the intensity variation value in each direction can be obtained.

For example, after obtaining the intensity variation value in a plurality of directions at each of the pixels P1 to P3, a direction which shows the largest absolute value of the intensity variation value may be defined as the intensity variation direction of the pixel. However, the intensity variation direction is not limited thereto, and a plurality of intensity variation values and intensity variation directions may also be extracted at each of the pixels P1 to P3. An intensity variation vector may also be defined based on the intensity variation value and the intensity variation direction, and the vector may also be used as information of each feature point. A description thereof will be described below in detail.

Figure 5:
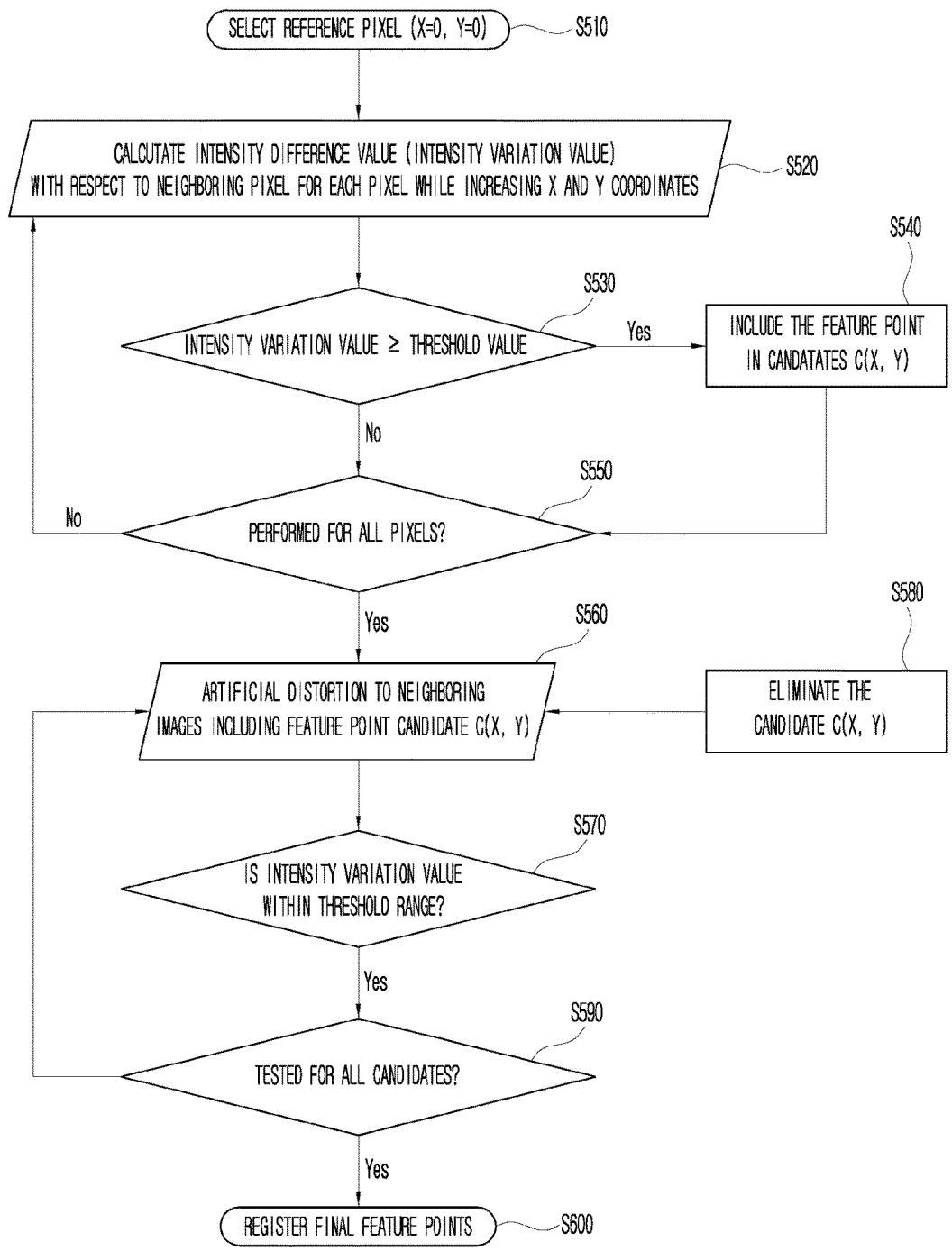
FIG. 5 is a view for describing a process of extracting feature information of a fingerprint image according to one embodiment of the present invention.

FIG. 5 is a flowchart for describing a process of detecting feature points of a fingerprint image according to the embodiment of the present invention.

First, each pixel of the fingerprint image acquired using the method described with reference to FIG. 2 is converted to representation by coordinates. To this end, any one pixel among pixels included in the fingerprint image is selected as a reference pixel, and the coordinates of the reference pixel is set to X=0 and Y=0 (S510). In various embodiments, a pixel located at an outermost edge of the fingerprint image, at a central portion of the fingerprint image, or the like may be designated as the pixel having the coordinates X=0 and Y=0, but the scope of the present invention is not limited thereby.

Once the reference pixel is set, the intensity difference value with respect to neighboring pixels is calculated for each of the pixels while increasing X and Y coordinates (S520). That is, the intensity variation value is calculated for all pixels included in the fingerprint image. As described above, an intensity variation value of a particular pixel may be defined as an intensity difference value between the pixel and a neighboring pixel. For example, when the reference pixel is a pixel at the bottom-left end of the fingerprint image, the intensity variation value for each pixel is calculated while increasing the X and Y coordinates to positive values. As another example, when the reference value is one of other pixels in the fingerprint image besides the edge region, the intensity variation value for each pixel is calculated while increasing absolute value of both the positive and negative values of X and Y coordinates.

While processing operation S510, it is determined whether the intensity variation value (the intensity difference value from a neighboring pixel) calculated for each pixel is within a threshold value t (S530). When a pixel p (x, y) in which the intensity variation value is a threshold value t or more is found, the pixel p (x, y) is included in a feature point candidate c (x, y) of the fingerprint (S540). That is, a pixel for which the intensity variation value, which is the intensity difference value, with respect to a neighboring pixel shows a certain degree or more is tentatively selected as a feature point of the fingerprint. Since the intensity variation value at a particular pixel is the intensity difference value from a neighboring pixel and thus may have a positive value (+) or negative value (−), it is preferable that an absolute value of the intensity variation value and a threshold value t be compared in operation S530. More feature point of the fingerprint may be obtained as the threshold value t becomes small, and fewer feature point of the fingerprint may be obtained as the threshold value t becomes large, thus the threshold value t may be set to a proper value depending on design.

When an intensity variation value of the pixel is less than a threshold value t as a result of the determining in operation S530 and after performing operation S540, whether operations S520 to S540 have been performed for all the pixels is determined (S550). When operations S520 to S540 have not been performed for all the pixels, operations S520 to S540 are continually repeated.

When operations S520 to S540 are performed for all the pixels, all the candidate feature points of the fingerprint are extracted. A large intensity difference value of a pixel when compared with that of a neighboring pixel represents a sharp shape change at the point. That is, since the point generates a remarkably sharp change in the shape than a general ridge and a neighboring region in the fingerprint, feature information such as a dent, protrusion, sweat pore, or the like may be extracted through operation S540.

After extracting all the feature point candidates, an artificial distortion is applied to neighboring images including the feature point candidate pixel c(x,y) of the fingerprint (S560).

The reason why the distortion is applied is to identify whether the feature point candidates extracted in operation S540 represent the intensity variation equal to or more than the threshold value due to noise or a temporary and restricted local change.

The artificial distortion may be applied, as one embodiment, by a blur effect etc. using the known Gaussian filter, but the scope of the present invention is not limited thereto and other known techniques on image noise filtering may be used.

After the above process, it is determined whether, after applying the artificial distortion to the image of the particular pixel and the neighboring region, the intensity variation value of the pixel is still within the valid range (S570), and, when determined not to be in the valid range, the candidate pixel c(x, y) is eliminated from the candidates (S580). Operation S570 may be accomplished by recalculating the intensity difference value, that is, the intensity variation value between the candidate pixel c(x, y) and the neighboring pixel after applying the artificial distortion and determining whether the difference value is within the threshold range. Since the artificial distortion is a process for removing noise, noise at the fingerprint image is removed by the artificial distortion. In the fingerprint image from which noise is removed, the pixel for which the intensity variation value is within the predictable range may be a feature point in the fingerprint. Regarding the threshold range, for example, when a normal distribution is provided based on the intensity variation value represented by each point of the fingerprint, a fixed range may be selected from the normal distribution.

When whether operations S560 to S580 are performed for all the candidate pixels c(x, y) is determined (S590) and the tests of operations S560 to S580 are completed for all the candidate pixels c(x, y), the pixels c(x, y) having an intensity variation value within the valid range after applying the artificial distortion are registered as final feature points (S600).

As a result of performing operations S560 to S600, a pixel tentatively selected as a feature point candidate due to noise or abnormal factors and not due to the intensity variation of an actual feature point which exists on the fingerprint are eliminated from being selected as a final feature point.

For example, when a normal distribution is provided based on the intensity variation value of all the pixels included in the fingerprint image, the pixels which deviate from the normal distribution may be excluded from being selected as final feature points.

In the embodiment, a pixel for which the intensity variation value is a threshold value or more is selected as the feature point of the fingerprint. Such a feature point is different from the minutiae described with reference to FIG. 3.

According to one embodiment, feature point information may include vector information in which the intensity variation value and the intensity variation direction are digitized. The intensity variation direction may be one direction or multiple directions. For example, vector information in which an intensity variation value A in a first direction and an intensity variation value B in a second direction are digitized may be included. Two or more pieces of vector information may be included to represent having the intensity variation value A in the first direction and having the intensity variation value B in the second direction.

In addition, when types of feature points (dented points, protrusion points, sweat pores, or the like based on ridges) are categorized based on the vector information related to the intensity variation value and the intensity variation direction, that is, the intensity variation vector, types of the feature points may be distinguished, and such information may also be included in the feature point information.

When all feature points are finally extracted, the vector information in which the intensity variation value and the intensity variation direction are digitized and mutual location information at the feature points may be cast into a template format and stored. For example, when a particular point is set as a reference point in the fingerprint image, the intensity variation value and the location information for all the feature points may be cast into a template format and stored. The above described particular point may be one of the feature points finally extracted, but may also be an arbitrary point.

The template may be generated over multiple times and combined. That is, acquiring fingerprint image for a user is performed over multiple times, a plurality of templates are generated from repeating each operations illustrated in FIG. 5 many times, and the templates may be combined into one template after each of the templates are converted into a standard coordinates system. When a sufficient number of feature points are not acquired, the user may be repeatedly requested to register a fingerprint.

Figure 6:
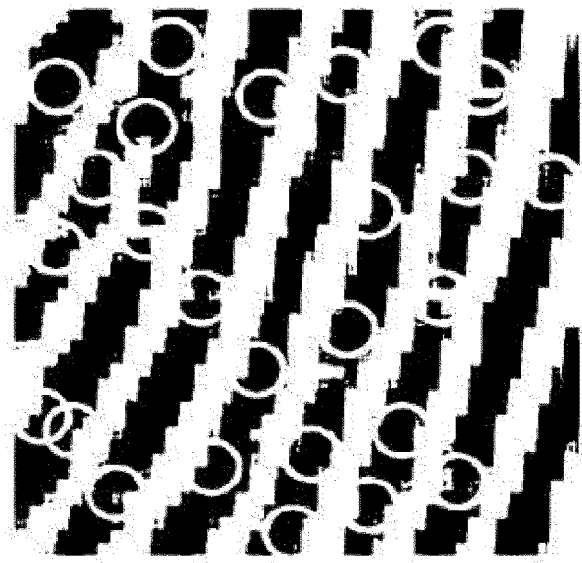
FIG. 6 is an example view illustrating feature information of a fingerprint image according to one embodiment of the present invention.

FIG. 6 is a view illustrating feature points of a fingerprint registered by the process described with reference to FIG. 5.

As illustrated in FIG. 6, a pixel point having an intensity variation value differentiated from neighboring pixels, that is, a feature point may be extracted in sufficient number to be used for fingerprint registration and identification from a minimum area (for example, 4 mm×4 mm) of the fingerprint image in which the usual minutiae (for example, a ridge end or bifurcation etc.) do not exist. Such feature points are represented in circles in FIG. 6.

According to the embodiment, a unique feature of a fingerprint may be extracted using the intensity variation value of a pixel with respect to ridges even in a fingerprint image of a minimum area in which minutiae (a bifurcation, an island, a ridge end, etc.) serving as the usual feature points of a fingerprint do not exist. Accordingly, even when a region for fingerprint sensing is reduced and the area from which fingerprint image is acquired is a minimum area, unique feature information of the fingerprint may be extracted therefrom and the fingerprint may be identified thereby.

Figure 7:
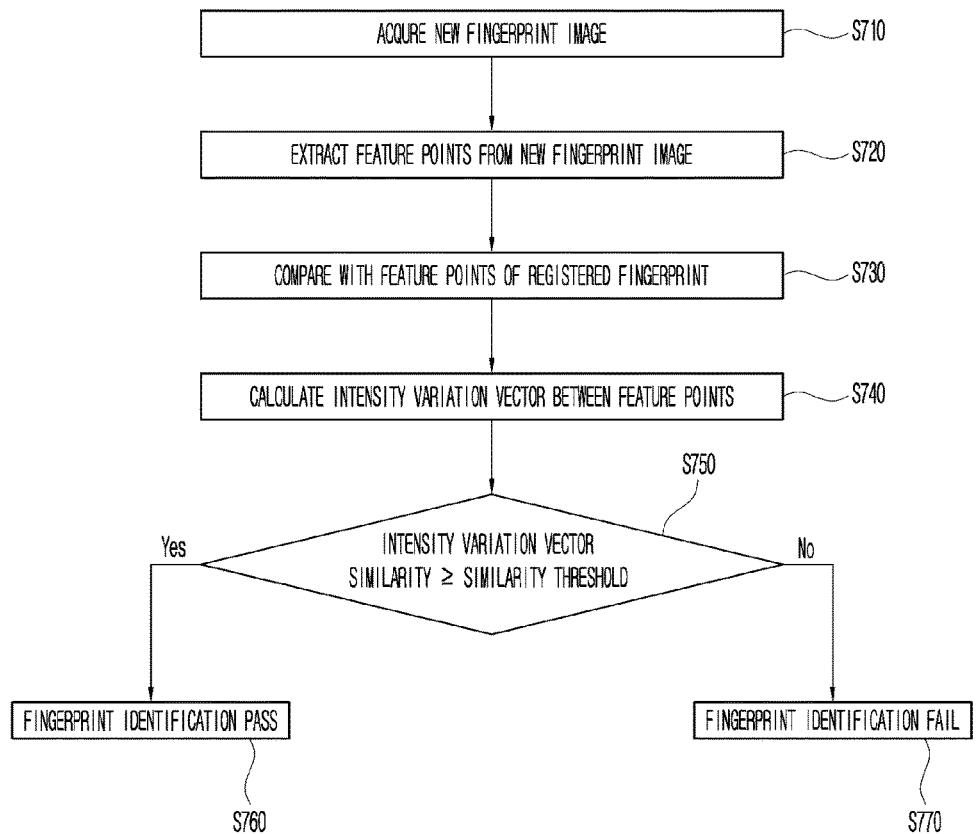
FIG. 7 is a flowchart for describing a process of identifying a fingerprint according to one embodiment of the present invention.

FIG. 7 is a flowchart for describing a method of fingerprint identification according to the embodiment of the present invention.

First, when a finger comes into contact with the fingerprint sensor for fingerprint identification, a fingerprint sensor starts acquiring a fingerprint image upon sensing the contact of the finger (S710). The fingerprint image may be acquired by the method described with reference to FIG. 2.

Once the fingerprint image is acquired, a point in which the intensity variation value is large is extracted as a feature point based on calculating the intensity difference with respect to neighboring pixels for all the pixels in the fingerprint image. That is, feature points are extracted from a newly acquired fingerprint image by the same method described with reference to FIG. 5 (S720).

Mutual location information for one or more pieces of feature point information may be cast into a template format and stored. Such location information between feature points, that is, geographic locations, are compared with geographic locations of the feature points of a preregistered fingerprint to determine where the feature points correspond to a portion in the fingerprint image (S730). The feature points of the preregistered fingerprint may have been in a fingerprint image acquired from a larger area and vice versa. Therefore, in operation S730, where the feature points of the newly acquired fingerprint correspond to feature points of the preregistered fingerprint is determined, or conversely, where the feature points of the preregistered fingerprint correspond to feature points of the newly acquired fingerprint is determined. That is, a process of finding a portion to be compared between feature points of the newly acquired fingerprint and feature points of the preregistered fingerprint is performed. Since a fingerprint image may be elastically contracted or expanded in some cases in sensing a fingerprint, comparing work may be performed while radially contracting or expanding a distance from a reference feature point to another feature point.

As a result of operation S730, once locations to be compared between the feature points of the newly acquired fingerprint and the feature points of the preregistered fingerprint are selected, similarity of the intensity variation vector of each feature point is calculated (S740). The intensity variation vector of each feature point includes the intensity variation value and the intensity variation direction at each feature point. That is, information is needed for identifying how sharply and in which direction the intensity variation value is changed. Accordingly, whether the fingerprints are identical, that is, similarity of the fingerprints may be calculated by comparing the intensity variation vector of the feature points which exist at the locations in which the feature points of the newly acquired fingerprint correspond to the feature points of the preregistered fingerprint.

When similarity of the intensity variation vector is calculated between the feature points, whether the similarity is equal to or more than a similarity threshold is determined (S750). Similarity refers to the similarity between the intensity variation vector of a first feature point among the feature points of the preregistered fingerprint and the intensity variation vector of a second feature point which corresponds to the first feature point among the feature points of the newly acquired fingerprint and may be defined as an absolute value of the difference between the two vectors. Meanwhile, the similarity threshold herein may be set according to a level required by security. Security level is low when low level similarity is determined to have passed the identification, and the conversely the security level is high, thus the similarity threshold may be set to a proper value depending on the desired security level.

When the similarity is equal to or more than the similarity threshold, the fingerprint is determined to have passed identification (S760), otherwise to have failed identification (S770).

According to the embodiment, since feature points of a fingerprint may be extracted only from a minimum area of the fingerprint image and thereby the fingerprint may be identified, fingerprint registration and fingerprint identification become possible even when the area from which the fingerprint image is acquired is small due to a reduced area for sensing a fingerprint.

In addition, since feature points may be extracted only from a minimum area of the fingerprint image and a comparison between different feature points is possible, fingerprint images may also be acquired by different methods from each other in registering and identifying the fingerprint. For example, a fingerprint image may be acquired by a touch method when registering the fingerprint and a fingerprint image may be acquired by a swipe method when identifying the fingerprint, and the converse case also is possible.

Figure 8:
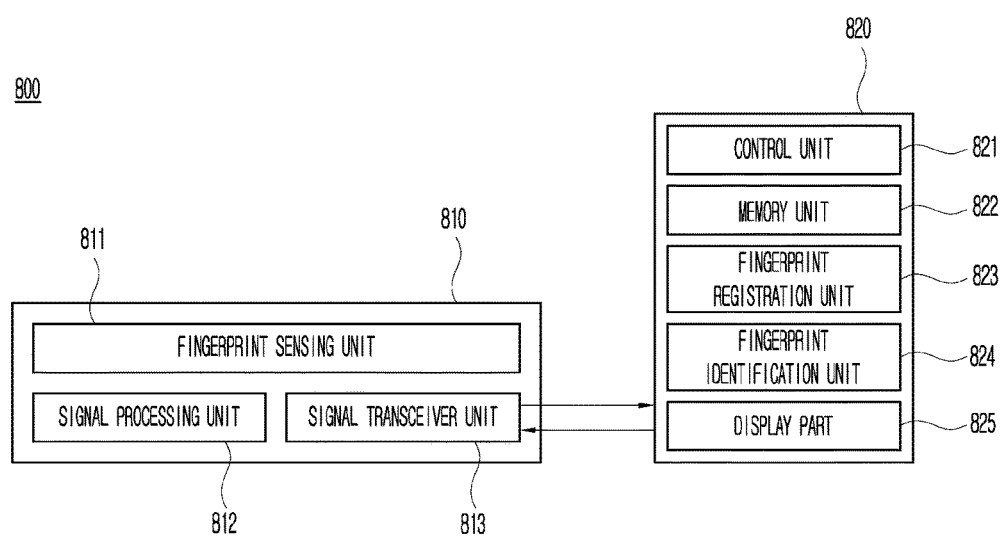
FIG. 8 is a view illustrating a configuration of an electronic device according to one embodiment of the present invention.

FIG. 8 is a block diagram illustrating a configuration of an electronic device according to an embodiment of the present invention.

Referring to FIG. 8, an electronic device 800 according to the embodiment includes a fingerprint sensor 810 and an information processing device 820.

Any digital device which performs a predetermined operation according to input from a user and includes a memory part and a microprocessor having calculation capability including a personal computer, a workstation, a personal digital assistant (PDA), a webpad, a mobile phone, a navigation, etc. may be adopted as the electronic device 800 according to one embodiment of the present invention.

The fingerprint sensor 810 is formed at a region of the electronic device 800. For example, the fingerprint sensor 810 may be positioned on a front surface of the electronic device 800, but according to various embodiments, the fingerprint sensor 810 may also certainly be positioned on a side surface, a rear surface, or a surface of a display part 825.

The fingerprint sensor 810 according to one embodiment includes a fingerprint sensing unit 811, a signal processing unit 812, and a signal transceiver unit 813.

The fingerprint sensing unit 811 senses a finger contact and scans a fingerprint of the finger contact to acquire a fingerprint image. The fingerprint sensing unit 811 may scan a fingerprint in various known methods including a capacitive method, an optical method, a pressure method, a thermal sensing method, etc. According to the embodiment, the fingerprint sensing unit 811 may also perform the fingerprint sensing by using a swipe method and a touch method in combination. For example, feature points of a fingerprint may be extracted after acquiring a fingerprint image by the swipe method when registering the fingerprint and feature points of a fingerprint may be extracted after acquiring a fingerprint image by the touch method when identifying the fingerprint, and performing in reverse order is also possible.

The signal processing unit 812 processes a fingerprint image frame, scanned over a period (speed) predetermined by the fingerprint sensing unit 811, into a signal. For example, the signal processing unit 812 may include an analog circuit, noise removing circuit, signal sensitivity amplifier circuit, analog-digital signal converter circuit, digital circuit, and the like which convert a fingerprint image into an electric signal. The signal processing unit 812 may be implemented in a form of an application-specific integrated circuit (ASIC) separate from or integrated with the fingerprint sensing unit 811.

The signal transceiver unit 813 transmits an electric signal of a fingerprint image, that is, a signal output from the signal processing unit 812 to the information processing device 820, and receives a signal (for example, a power signal, a control signal, a data signal for registered fingerprint, etc.) from the information processing device 820. The signal transceiver unit 813 may employ an interface of the I2C method or the SPI method.

The information processing device 820 includes a control unit 821, a memory unit 822, a fingerprint registration unit 823, a fingerprint identification unit 824, and a display part 825. In the electronic device 800, the other components besides the fingerprint sensor 810 are illustrated as the information processing device 820 for convenience of description, but configuration of the information processing device 820 is not limited to the components illustrated in the drawing, and various components including audio, touch detection portion, etc. may be added in some embodiments.

The control unit 821 controls overall operations of the fingerprint sensor 810 and the information processing device 820.

The memory unit 822 temporally or permanently stores fingerprint images or feature point information in a template form. In addition, the memory unit 822 stores data and firmware information of the electronic device 800. The memory unit 822 may be implemented by volatile memories such as a static-random access memory (S-RAM) and a dynamic-RAM (D-RAM), and non-volatile memories such as a read-only memory (ROM), a flash memory, etc.

The fingerprint registration unit 823, by the process described with reference to FIG. 5, extracts feature points from a fingerprint image of a finger and registers the features points as fingerprint information. The registered fingerprint information is stored in the memory unit 822.

The fingerprint identification unit 824, by the process described with reference to FIG. 7, performs fingerprint identification by comparing the fingerprint information stored in the memory unit 822 and feature points of the current acquisition of a fingerprint image.

The fingerprint registration unit 823 and the fingerprint identification unit 824 are illustrated as separate components in FIG. 8, however the fingerprint registration unit 823 and the fingerprint identification unit 824 may also be integrated to be implemented as one module. The fingerprint registration unit 823 and the fingerprint identification unit 824 which are in a program module form may be stored in a particular region of the control unit 811 or the memory unit 812 in an algorithm form. It is preferable that the algorithm be encrypted in high level security and managed so that neither access via other routes or by modifications nor a transfer of the fingerprint information is allowed.

The display part 825 may display operation status of the electronic device 800 or any other information. The display part 825 according to one embodiment may display operation status of the fingerprint registration unit 823 and the fingerprint identification unit 824 (for example, information such as passing or failing of registration and identification, etc.).

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

The invention claimed is:

1. A fingerprint information processing method for an electronic device including a minimum fingerprint sensing area, the method comprising:
    acquiring a fingerprint image from the fingerprint sensing area;
    calculating an intensity variation value defined as an intensity difference value with respect to a neighboring pixel for each pixel of the fingerprint image;
    selecting points, each of which the intensity variation value is a threshold value or more, as feature point candidates;
    applying artificial distortion to a region including the feature point candidates and neighboring pixels thereof for noise filtering; and
    selecting candidates, each of which the intensity variation value after the artificial distortion is within a threshold range, among the feature point candidates as final feature points.

2. The method of claim 1, further comprising performing fingerprint identification by comparing the final feature points with feature points of a preregistered fingerprint.

3. The method of claim 2, wherein the performing of the fingerprint identification includes comparing an intensity variation vector having an intensity variation value and an intensity variation direction at each of the final feature points with an intensity variation vector at each of the feature points of the preregistered fingerprint.

4. The method of claim 3, wherein the performing of the fingerprint identification further includes, before the comparing, selecting a target portion to be compared by comparing locations of the final feature points and the feature points of the preregistered fingerprint.

5. The method of claim 1, further comprising casting each intensity variation value and mutual location information of the final feature points into a template format for storing.

6. The method of claim 1, further comprising storing at least one of an intensity variation vector including an intensity variation value and an intensity variation direction and types of the feature points in the final feature points.

7. The method of claim 1, wherein the applying of the artificial distortion includes applying a Gaussian filter to a region including the feature point candidates and the neighboring pixels thereof.

8. An electronic device comprising:
    a fingerprint sensor which scans a fingerprint of a finger in contact with a minimum fingerprint sensing area to acquire a fingerprint image; and
    an information processing device which performs:
    calculating an intensity variation value defined as an intensity difference value from a neighboring pixel for each pixel of the fingerprint image;
    selecting points, each of which the intensity variation value is equal to or more than a threshold value, as feature point candidates; and
    selecting candidates, each of which the intensity variation value after the artificial distortion for noise filtering is within a threshold range, among the feature point candidates as final feature points.

9. The device of claim 8, wherein the information processing device includes a fingerprint identification unit which performs fingerprint identification by comparing an intensity variation vector including an intensity variation value and an intensity variation direction at each of the final feature points with an intensity variation vector at each of the feature points of a preregistered fingerprint.

10. The device of claim 8, wherein the information processing device includes a fingerprint registration unit which casts each intensity variation value and mutual location information of the final feature points into a template format for storing.

* * * * *